US012785201B2

(12) United States Patent
Lim et al.

(10) Patent No.: US 12,785,201 B2
(45) Date of Patent: Nov. 3, 2026

(54) SECONDARY BATTERY

(71) Applicant: LG Energy Solution, Ltd., Seoul (KR)

(72) Inventors: Hun Hee Lim, Daejeon (KR); Sang Hun Kim, Daejeon (KR); Min Hyeong Kang, Daejeon (KR); Hyung Kyun Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 848 days.

(21) Appl. No.: 18/009,532

(22) PCT Filed: Nov. 17, 2020

(86) PCT No.: PCT/KR2020/016181
§ 371 (c)(1),
(2) Date: Dec. 9, 2022

(87) PCT Pub. No.: WO2021/256629
PCT Pub. Date: Dec. 23, 2021

(65) Prior Publication Data

US 2023/0223645 A1 Jul. 13, 2023

(30) Foreign Application Priority Data

Jun. 15, 2020 (KR) ........................ 10-2020-0072596

(51) Int. Cl.
*H01M 50/30* (2021.01)
*B65D 49/02* (2006.01)
(Continued)

(52) U.S. Cl.
CPC ............ *H01M 50/30* (2021.01); *B65D 49/02* (2013.01); *H01M 50/105* (2021.01);
(Continued)

(58) Field of Classification Search
CPC .. H01M 50/35–50/394; H01M 50/655; H01M 10/52; H01M 50/30; H01M 50/325;
(Continued)

(56) References Cited

U.S. PATENT DOCUMENTS 4,678,725 A 7/1987 Kikuchi et al.
8,062,780 B2 11/2011 Yageta et al.
(Continued)

FOREIGN PATENT DOCUMENTS

CN 106479060 A * 3/2017 ............. F04B 39/00
JP 11086823 A * 3/1999
(Continued)

OTHER PUBLICATIONS

Machine Translation CN 106479060 (Year: 2017).*
(Continued)

*Primary Examiner* — Michael A Band
(74) *Attorney, Agent, or Firm* — Lerner David LLP

(57) ABSTRACT

A secondary battery is provided with a pouch, in which a sealing portion formed on an edge of the pouch is sealed when an electrode assembly and an electrolyte are enclosed. The secondary battery includes a valve which is mounted on a sealing portion so that one end of the valve is disposed inside the pouch, and the other end of the valve is disposed outside the pouch and discharges a gas generated inside the pouch to the outside. The valve comprises an inner tube filled with an adhesive and made of a material that is deformed when swelling occurs. When the swelling occurs to increase in pressure inside the pouch, a gap is generated in a portion that is filled with the adhesive, and the gas within the pouch is discharged to the outside though the gap.

11 Claims, 6 Drawing Sheets

(51) Int. Cl.
*H01M 50/105* (2021.01)
*H01M 50/211* (2021.01)
*H01M 50/325* (2021.01)
*H01M 50/35* (2021.01)

(52) U.S. Cl.
CPC ....... *H01M 50/211* (2021.01); *H01M 50/325* (2021.01); *H01M 50/35* (2021.01); *H01M 50/394* (2021.01)

(58) Field of Classification Search
CPC ............... B65D 49/02; B65D 51/1661; B65D 51/1666; B65D 53/08
See application file for complete search history.

(56) References Cited

U.S. PATENT DOCUMENTS

| | | | | |
|---|---|---|---|---|
| 9,397,325 | B2 * | 7/2016 | Kinuta .............. | H01M 50/3425 |
| 2003/0232236 | A1 | 12/2003 | Mitchell et al. | |
| 2009/0081542 | A1 | 3/2009 | Yageta et al. | |
| 2010/0239895 | A1 | 9/2010 | Yang et al. | |
| 2012/0064381 | A1 | 3/2012 | Yageta et al. | |
| 2013/0122336 | A1 | 5/2013 | Park et al. | |
| 2015/0072185 | A1 | 3/2015 | Cho et al. | |
| 2016/0036024 | A1 | 2/2016 | Choi et al. | |
| 2020/0028128 | A1 | 1/2020 | Hwang et al. | |
| 2020/0212399 | A1 | 7/2020 | Choi et al. | |
| 2020/0259146 | A1 | 8/2020 | Kim et al. | |
| 2020/0321577 | A1 | 10/2020 | Kim et al. | |
| 2021/0218106 | A1 | 7/2021 | Mochizuki et al. | |
| 2021/0341068 | A1 | 11/2021 | Sasaki et al. | |
| 2022/0263187 | A1 | 8/2022 | Choi et al. | |

FOREIGN PATENT DOCUMENTS

| | | | | | |
|---|---|---|---|---|---|
| JP | 2001093489 | A | | 4/2001 | |
| JP | 2006179442 | A | * | 7/2006 | |
| JP | 2008293992 | A | | 12/2008 | |
| JP | 2010287451 | A | | 12/2010 | |
| JP | 2019207782 | A | | 12/2019 | |
| JP | 2020-509553 | A | | 3/2020 | |
| KR | 20080019551 | A | | 3/2008 | |
| KR | 20080036257 | A | | 4/2008 | |
| KR | 20100110666 | A | | 10/2010 | |
| KR | 20110103079 | A | | 9/2011 | |
| KR | 20120050207 | A | | 5/2012 | |
| KR | 20130053102 | A | | 5/2013 | |
| KR | 20130099892 | A | | 9/2013 | |
| KR | 20140049748 | A | | 4/2014 | |
| KR | 20140067246 | A | | 6/2014 | |
| KR | 101419570 | B1 | | 7/2014 | |
| KR | 20150031611 | A | * | 3/2015 | .......... H01M 10/625 |
| KR | 20150039290 | A | | 4/2015 | |
| KR | 20160014828 | A | | 2/2016 | |
| KR | 20160051037 | A | | 5/2016 | |
| KR | 20160111614 | A | | 9/2016 | |
| KR | 20170103236 | A | | 9/2017 | |
| KR | 20180023817 | A | | 3/2018 | |
| KR | 20180038880 | A | | 4/2018 | |
| KR | 20190032019 | A | | 3/2019 | |
| KR | 20190042215 | A | | 4/2019 | |
| KR | 20190042953 | A | | 4/2019 | |
| KR | 20190123059 | A | | 10/2019 | |
| KR | 20190126617 | A | | 11/2019 | |
| KR | 20190126618 | A | | 11/2019 | |
| KR | 20190129326 | A | | 11/2019 | |
| KR | 20190142498 | A | | 12/2019 | |
| KR | 20200001052 | A | | 1/2020 | |
| WO | 2006098242 | A1 | | 9/2006 | |
| WO | 2020-080325 | A1 | | 4/2020 | |

OTHER PUBLICATIONS

Machine Translation KR 20190126617 (Year: 2019).*
Machine Translation JP 11086823 (Year: 1999).*
Machine Translation JP 2006179442 (Year: 2006).*
Machine Translation KR 20150031611 (Year: 2015).*
International Search Report for PCT/KR2020/016181 mailed Mar. 11, 2021. 3 pgs.
Extended European Search Report including Written Opinion for Application No. 20940670.1 dated Jun. 26, 2024, pp. 1-6.

* cited by examiner

SECONDARY BATTERY

CROSS-REFERENCE TO RELATED APPLICATIONS

The present application is a national phase entry under 35 U.S.C. § 371 of International Application No. PCT/KR2020/016181 filed Nov. 17, 2020, which claims priority from Korean Patent Application No. 10-2020-0072596 filed on Jun. 15, 2020, all of which are incorporated herein by reference.

FIELD OF THE INVENTION

The present disclosure relates to a secondary battery in which an electrode assembly and an electrolyte are embedded in a pouch, and more particularly, to a pouch-type secondary battery having a valve capable of discharging a gas to the outside when the gas is generated in the pouch.

BACKGROUND OF THE INVENTION

The demands for high-efficiency secondary batteries are rapidly increasing in the mobile device and electric vehicle fields. Among such the secondary batteries, a lithium secondary battery having high energy density, maintaining a relatively high voltage, and having a low self-discharge rate is commercially widely used, and research and development for improving performance thereof is actively being conducted.

The secondary battery has a structure in which an electrode assembly and an electrolyte are embedded in a case such as a can or a pouch. The electrode assembly has a structure in which positive electrodes, separators, and negative electrodes are repeatedly stacked. In general, the electrode assembly may be classified into a winding type electrode assembly in which the positive electrodes, the separators, and the negative electrodes, which are in the stacked state, are rolled to be embedded in the case and a stack type (stacked) electrode assembly in which the positive electrodes, the separators, and the negative electrodes, each of which is cut to a predetermined size, are stacked.

Since the winding type electrode assembly has a spirally wound structure, the winding type electrode assembly is suitable for being mounted on a cylindrical battery, but is disadvantageous in space utilization for a prismatic or pouch type battery. On the other hand, since the stack type electrode assembly is adjusted in size when the electrode and the separator are cut, the prismatic shape fitted with the case is easily obtained, but a manufacturing process is relatively complicated, and the stack type electrode assembly is relatively vulnerable to an external impact. Also, a stack & folding method has been developed to combine the advantages of the winding type and the stack type. In the stack & folding method, a C-type bicell (a bicell having a stack structure of a positive electrode/separator/negative electrode/separator/positive electrode) and an A-type bicell (a bicell having a stack structure of a negative electrode/separator/positive electrode/separator/negative electrode) are placed on a folding separator to fold the bicells, thereby manufacturing the electrode assembly.

The electrode assembly manufactured in various manners as described above is mounted in a case such as a can or a pouch.

Among them, the pouch-type battery has advantages such as higher energy density per unit weight and volume, enables thinner and lighter battery, as well as a lower material cost as an exterior, and thus has been actively developed in recent years. As illustrated in FIG. 1, which illustrates a state in which an electrode assembly 3 is mounted in a state in which a pouch 1 is opened, the pouch-type secondary battery is manufactured so that the electrode assembly 3 is seated in the pouch 1 in a state in which upper and lower portions of the pouch 1 are separated from each other, and when an electrolyte is injected, sealing portions 2*a* and 2*b* formed on edges of the upper and lower portions are sealed. Here, an end of an electrode lead 3*a* drawn out from the electrode assembly 3 is sealed in a state of being disposed to protrude to the outside.

The pouch-type battery has a problem in that swelling occurs during the charging/discharging in the manufacturing process and during the use as a charging/discharging device after the manufacturing is performed.

Such swelling is a phenomenon in which a gas is generated inside the pouch 1 due to the vaporization of the electrolyte to deform an outer appearance of the pouch 1 and deteriorate charge/discharge performance of the secondary battery, and in severe cases, there is a risk of explosion.

Therefore, when the gas is generated inside the pouch, it is necessary to remove the gas.

BRIEF SUMMARY OF THE INVENTION

An aspect of the present disclosure is a secondary battery having a valve capable of discharging a gas to the outside when the gas is generated inside a pouch to increase in internal pressure.

A devices according to the present disclosure for achieving the above-described object provides a secondary battery provided with a pouch, in which a sealing portion formed on an edge of the pouch is sealed when an electrode assembly and an electrolyte are enclosed, the secondary battery comprising: a valve which is mounted on a sealing portion so that one end of the valve is disposed inside the pouch, and the other end of the valve is disposed outside the pouch and discharges a gas generated inside the pouch to the outside, wherein the valve comprises an inner tube filled with an adhesive and made of a material that is deformed when swelling occurs, and when the swelling occurs to increase in pressure inside the pouch, a gap is generated in a portion that is filled with the adhesive, and the gas within the pouch is discharged to the outside though the gap.

The valve may comprise an outer tube which is mounted on the sealing portion so that one end of the outer tube is disposed inside the pouch, and the other end of the outer tube is disposed outside the pouch and is mounted so that the inner tube is inserted in a longitudinal direction inside the outer tube, both ends of the outer tube and the inner tube may be connected to each other to be sealed so that a chamber that is a sealed space is formed between the outer tube and the inner tube, and the inner tube may be deformed inside the outer tube.

The outer tube may be made of a material that is not deformed even when the swelling occurs, and when the swelling occurs to increase in pressure inside the pouch, the inner tube may be deformed so that a volume of the chamber is contracted.

Each of the outer tube and the inner tube may be made of polypropylene, which is a material contained in the pouch, wherein the outer tube may be manufactured with relatively low flexibility and high rigidity compared to the inner tube, and the inner tube may be manufactured with relatively high flexibility and low rigidity compared to the outer tube.

Gaseous nitrogen ($N_2$) may be injected into the chamber and be replaced with other stable gases.

Each of the outer tube and the inner tube may have a circular or elliptical cross-section.

The adhesive may be a material containing an epoxy binder. The adhesive may be a material containing an acrylate binder.

A plurality of hooks may be installed on each of one surface and the other surface, which face each other, within the inner tube so that the hooks are physically coupled to each other in a hook-and-loop fastener manner.

The gap formed in the inner tube may be filled again after discharging the gas.

The valve may be disposed in parallel to an electrode lead that is drawn out from the electrode assembly to protrude out of the pouch.

A device according to the present disclosure may additionally provide a secondary battery module manufactured by coupling the plurality of secondary batteries having the above-described configuration to each other.

In a device according to the present disclosure having the above configuration, the adhesive may be filled in the inner tube to prevent the electrolyte from leaking and prevent the external moisture from being permeated, but only when the pressure inside the pouch increases, the gap may be generated to discharge the gas, thereby efficiently preventing the swelling from occurring.

Since the inner tube is disposed in the outer tube so that the inner tube is deformed to be expanded in diameter, the inner tube may be protected from the external impact.

Gaseous nitrogen may be injected into the chamber formed between the inner tube and the outer tube to protect the inner tube, and the gaseous nitrogen may be contracted while the inner tube is expanded to facilitate the generation of the gap in the adhesive.

Furthermore, the plurality of hooks may be installed on each of one surface and the other surface, which face each other, within the inner tube so that the hooks are physically coupled to each other in the hook-and-loop fastener manner to adjust the internal pressure standard within the pouch, in which the gap is generated in the adhesive, and the expansion speed of the gap.

DETAILED DESCRIPTION

Figure 1:
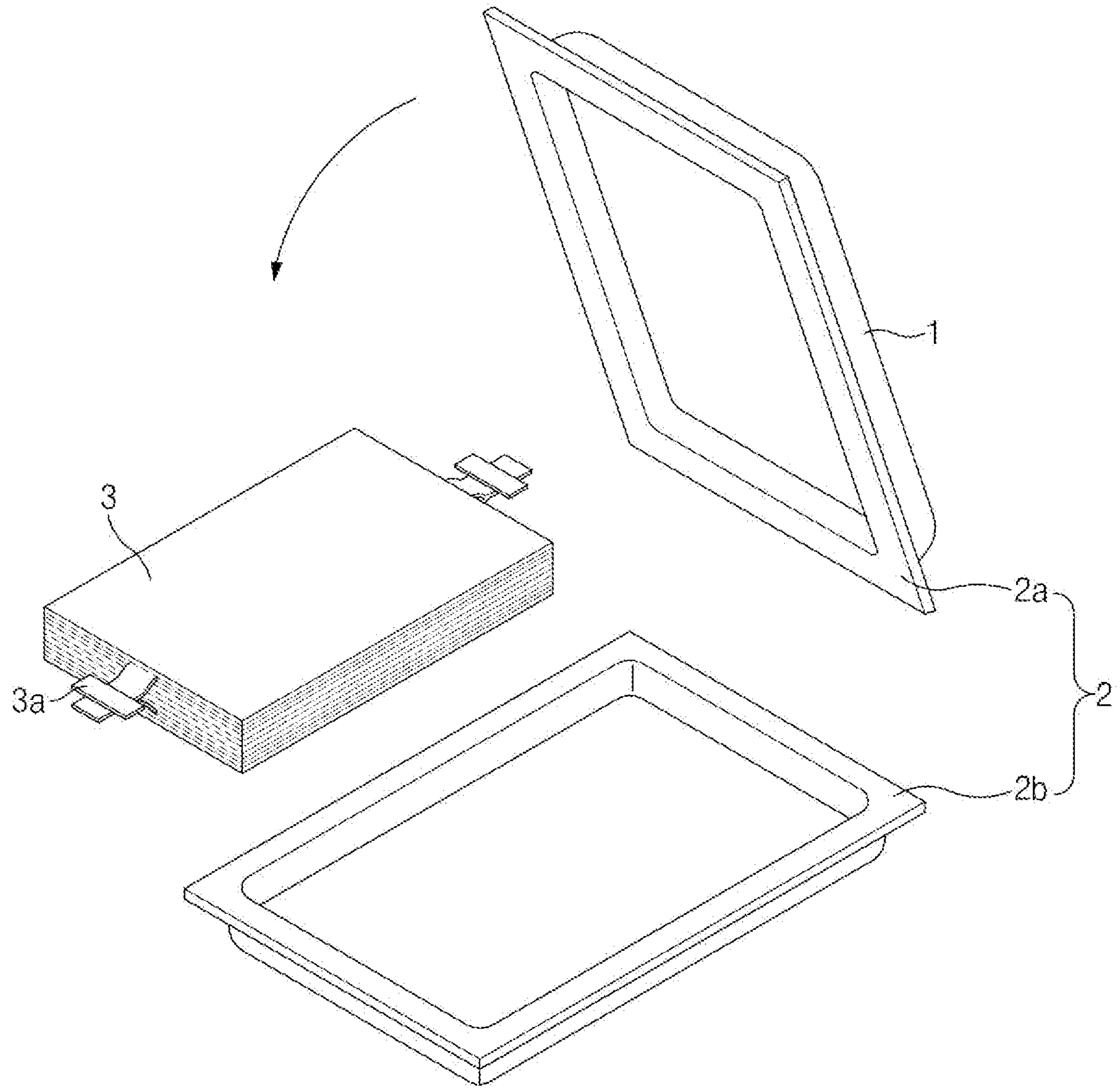
FIG. 1 is a perspective view illustrating a state in which an electrode assembly is mounted in a state in which a pouch is opened.

Hereinafter, embodiments of the present invention will be described in detail with reference to the accompanying drawings in such a manner that the technical idea of the present disclosure may easily be carried out by a person with ordinary skill in the art to which the disclosure pertains. The present invention may, however, be embodied in different forms and should not be construed as limited to the embodiments set forth herein.

In order to clearly describe the present disclosure, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present disclosure relates to a secondary battery provided with a pouch 1 in which sealing portions 2*a* and 2*b* formed on an edge 2 are sealed when an electrode assembly 3 and an electrolyte are enclosed, and more particularly, to a secondary battery provided with a valve 10 so that when a gas is generated inside the pouch 1 to increase in internal pressure, the gas is discharged to the outside. Hereinafter, embodiments according to the present invention will be described with reference to the accompanying drawings.

First Embodiment

Figure 2:
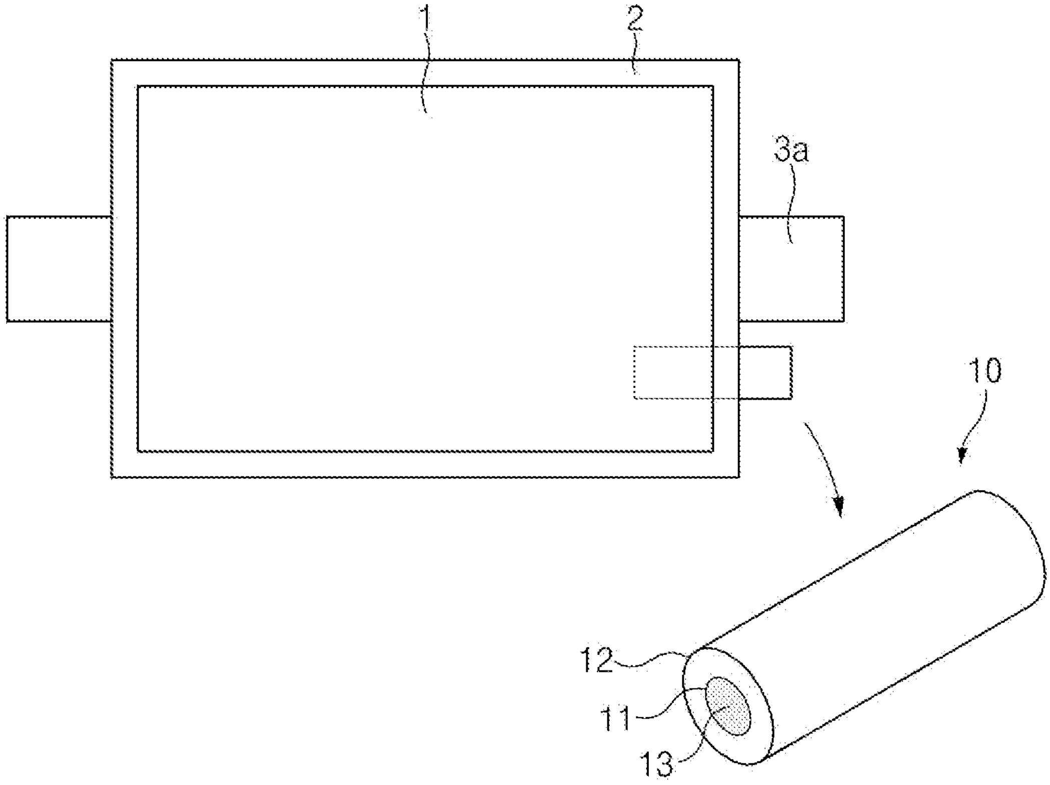
FIG. 2 is a view illustrating a state in which a valve according to a first embodiment of the present invention is mounted in a pouch-type secondary battery.
Figure 3:
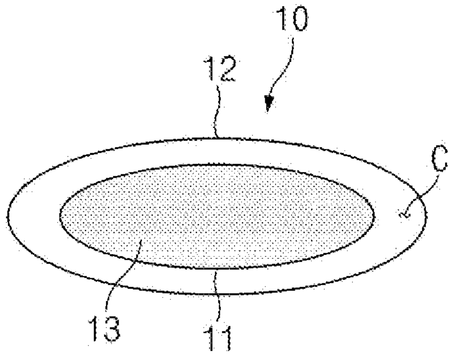
FIG. 3 is a transverse cross-sectional view of the valve according to the first embodiment of the present invention.
Figure 4:
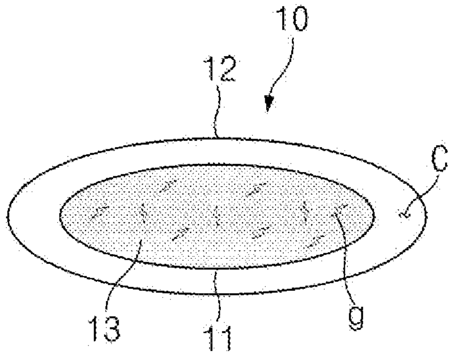
FIG. 4 is a transverse cross-sectional view illustrating a state a gap g is generated in an adhesive in the valve according to the first embodiment of the present invention.

FIG. 2 is a view illustrating a state in which a valve according to a first embodiment of the present invention is mounted in a pouch-type secondary battery, FIG. 3 is a transverse cross-sectional view of the valve according to the first embodiment of the present invention, and FIG. 4 is a transverse cross-sectional view illustrating a state a gap g is generated in an adhesive in the valve according to the first embodiment of the present invention.

Referring to the drawings, as illustrated in FIG. 2, a secondary battery according to this specification comprises a valve 10. The valve 10 is mounted so that one end of the valve 10 is disposed inside a pouch, and the other end of the valve 10 disposed outside the pouch (in more detail, the valve 10 is mounted between sealing portions adhering to each other). That is, the valve 10 is disposed in parallel to an electrode lead 3*a* that is drawn out from the electrode assembly to protrude out of the pouch at an interval.

The valve 10 has a function of discharging a gas generated inside the pouch 1 to the outside and has a structure in which a passage is blocked by an adhesive 13 in a tube 10 in which the passage is formed to communicate between the inside and the outside.

That is, as illustrated in FIG. 3, the valve 10 comprises an inner tube 11 which has one end disposed inside the pouch 1 and the other end disposed outside the pouch 1, and is filled with the adhesive 13 and an outer tube 12 mounted on a sealing portion so that one end of the outer tube is disposed inside the pouch 1, and the other end of the outer tube is disposed outside the pouch 1, and also mounted so that the inner tube 11 is inserted in a longitudinal direction inside the outer tube 12.

The inner tube 11 is made of a material that is capable of being deformed when swelling is generated in the pouch to increase in pressure. Thus, when the internal pressure increases, a gap g is generated in a portion of the valve 10 that is filled with the adhesive 13, and when the gap g opens the adhesive 13 in the longitudinal direction of the inner tube 11, the gas within the pouch is discharged to the outside through the gap g.

Here, both ends of the outer tube 12 and the inner tube 11 are connected to each other to be sealed so that a chamber C that is a sealed space is formed between the outer tube 12 and the inner tube 11. The inner tube 11 may be deformed within the outer tube 12 in a direction in which a diameter thereof is expanded.

The outer tube 12 is made of a material that is not deformed even when the swelling occurs. Thus, when the swelling occurs to increase in pressure within the pouch 1, the inner tube 11 is deformed so that a volume of the chamber C is contracted.

That is, when a pressure of the gas acts on the end of the inner tube 11 inside the pouch 1, stress acts on a surface of the adhesive 13, and thus, at least one or more gaps g are generated as illustrated in FIG. 4 (one gap may be generated in an edge portion or a center, unlike the shape of FIG. 4). That is, although a plurality of gaps g are formed in FIG. 4, and a passage through which the gas passes is illustrated by a single arrow in FIG. 5, the plurality of gaps g or one gap g may be formed in plurality according to a kind or type of the adhesive, and also, the gap may have various sizes.

Figure 5:
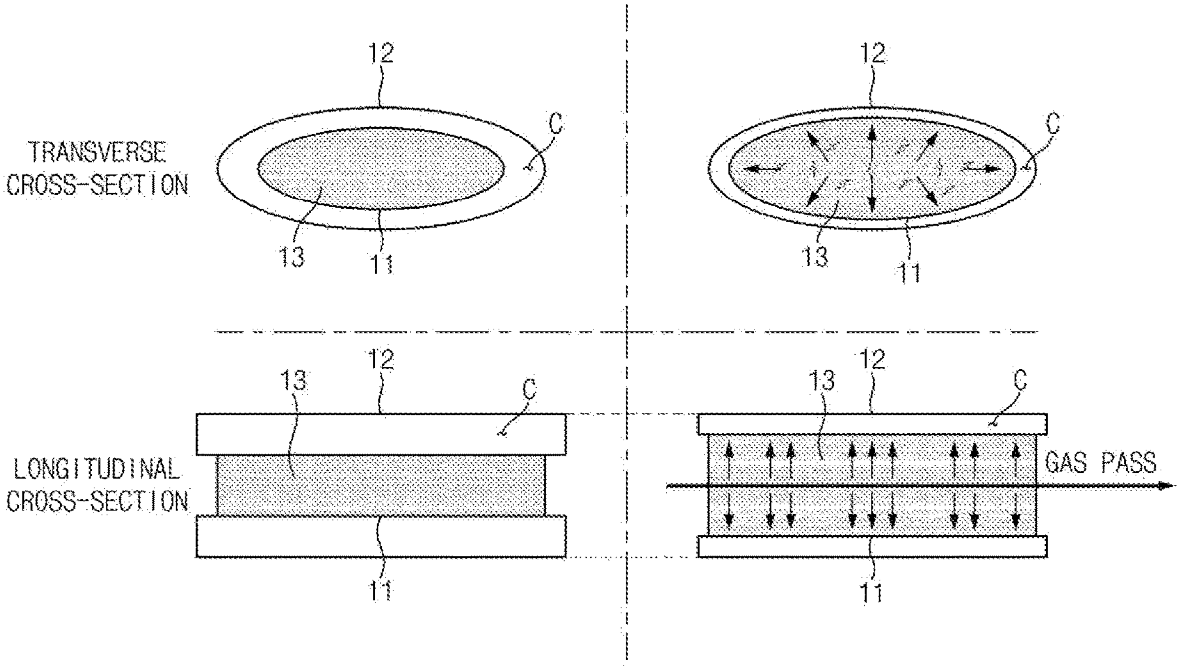
FIG. 5 is a longitudinal cross-sectional view and a transverse cross-sectional view (left drawing) when the valve according to the first embodiment of the present invention is in a normal state and a longitudinal cross-sectional view and a transverse cross-sectional view (right drawing) when a gas is generated inside the pouch to increase in an internal pressure.

As illustrated in FIG. 5, which illustrates a longitudinal cross-sectional view and a transverse cross-sectional view (upper and lower drawings at the left) when the valve 10 is in a normal state and a longitudinal cross-sectional view and a transverse cross-sectional view (upper and lower drawings at the right) when the gas is generated inside the pouch to increase in an internal pressure, since a pressure is continuously applied to the gap g, the gap g is expanded in the longitudinal direction of the inner valve 11 and opened up to the outside of the inner valve 11.

Thus, the gas inside the pouch 1 is discharged to the outside along the passage opened by the gap g. Simultaneously with the formation of the gap g and the expansion of the gap, the inner tube 11 increases in diameter so that the chamber C is contracted.

Here, since no deformation occurs in shape of the outer valve 12, contraction of the gas in the chamber C and expansion of the inner valve 11 may be performed at the same time. Since the contraction of the air inside the chamber C and the increase in diameter of the inner tube 11 are performed at the same time, the gap g that allows a free volume of the adhesive 13 to increase may increase in size to form the passage through which the gas is discharged.

It is preferable that each of the outer tube 12 and the inner tube 11 is made of polypropylene, which is a material contained in the pouch so that the pouch 1 is sealed when sealing.

However, the outer tube 12 is manufactured with relatively low flexibility and high rigidity compared to the inner tube 11, and the inner tube 11 is manufactured with relatively high flexibility and low rigidity compared to the outer tube 12. Such, the flexibility and rigidity may be adjusted by controlling molding conditions or adding additives.

Furthermore, gaseous nitrogen ($N_2$) may be injected into the chamber C, or other stable gases may be injected instead of the gaseous nitrogen.

It is preferable that each of the outer tube 12 and the inner tube 11 has a circular or elliptical cross-section so that a relatively uniform pressure is applied in all directions, but may be manufactured to have a square or other polygonal cross-section. Also, each of the outer tube 12 and the inner tube 11 may be manufactured so that a portion inside the pouch 1 has a relatively large diameter, and an opposite portion has a relatively small diameter so as to efficiently apply the pressure of the gas.

Furthermore, the adhesive 13 may be a material containing an epoxy binder or a material containing an acrylic binder. The adhesive 13 may be selected from a variety of materials that do not react with the electrolyte and may be filled in the inner tube 11 as gel or in the form of a gel as well as a soft solid state.

Also, in the present example, the gap g formed in the inner tube 11 may be filled again after the gas is discharged. Thus, the valve 10 according to the present example may repeatedly provide a function of sealing after repeatedly discharging the gas until the lifespan of the secondary battery is over.

Second Embodiment

Figure 6:
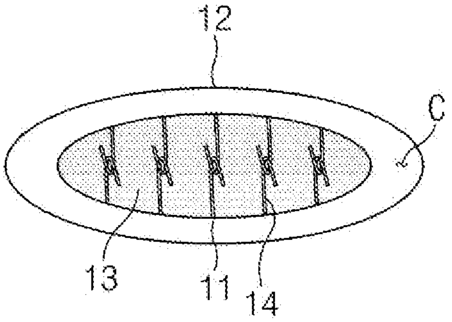
FIG. 6 is a transverse cross-sectional view of a valve according to a second embodiment of the present invention.

FIG. 6 is a transverse cross-sectional view of a valve according to a second embodiment of the present disclosure. A valve 10 according to this embodiment has a structure in which an inner tube 11 is disposed inside an outer tube 12, and an adhesive 13 is filled in the inner tube 11, like that in the first embodiment. Also, in order to increase in physical bonding force, a plurality of hooks 14 are additionally installed as illustrated in FIG. 6.

That is, an inner circumferential surface of the inner tube 11 is provided with a plurality of hooks 14 paired to increase in bonding force in a specific direction.

Since the hooks 14 are physically coupled to each other in a hook-and-loop fastener method (i.e., a Velcro tape coupling method), a pressure at which a gap g is generated and an expansion speed of the gap may be reduced.

In the present example having the above configuration, the adhesive 13 may be filled in the inner tube 11 to prevent the electrolyte from leaking and prevent the external moisture from being permeated, but only when the pressure inside the pouch increases, the gap g may be generated to discharge the gas, thereby efficiently preventing the swelling from occurring.

Since the inner tube 11 is disposed in the outer tube 12 so that the inner tube 11 is deformed to be expanded in diameter, the inner tube 11 may be protected by the outer tube 12 from the external impact.

Gaseous nitrogen may be injected into a chamber C formed between the inner tube 11 and the outer tube 12 to protect (buffer) the inner tube 11, and the gaseous nitrogen may be contracted while the inner tube 11 is expanded to facilitate the generation of the gap in the adhesive.

Furthermore, the plurality of hooks 14 may be installed on each of one surface and the other surface, which face each other, within the inner tube 11 so that the hooks are physically coupled to each other in the hook-and-loop fastener manner to adjust the internal pressure standard within the pouch, in which the gap g is generated in the adhesive 13, and the expansion speed of the gap.

While the embodiments of the present disclosure have been described with reference to the specific embodiments, it will be apparent to those skilled in the art that various changes and modifications may be made without departing from the spirit and scope of the disclosure as defined in the following claims.

DESCRIPTION OF THE SYMBOLS

10: valve
11: Inner tube
12: Outer tube
13: Adhesive
14: Hook
C Chamber
g: Gap

The invention claimed is:

1. A secondary battery comprising:

a pouch, in which a sealing portion formed on an edge of the pouch is sealed when an electrode assembly and an electrolyte are enclosed;

a valve which is mounted on the sealing portion so that one end of the valve is disposed inside the pouch, and another end of the valve is disposed outside the pouch and discharges a gas generated inside the pouch to the outside, wherein the valve comprises an inner tube entirely filled with an adhesive and made of a material that is deformed when swelling occurs, said adhesive in a form of a gel or a solid state, and when the swelling occurs due to an increase in pressure inside the pouch, a gap is generated in the adhesive due to the pressure of the gas acting on a surface of the adhesive, and the gas within the pouch is discharged to the outside through the gap, the gap extending along a longitudinal directional of the inner tube, wherein the gap formed in the adhesive disappears after discharging the gas, and wherein the valve comprises an outer tube which is mounted on the sealing portion so that one end of the outer tube is disposed inside the pouch, and another end of the outer tube is disposed outside the pouch and is mounted so that the inner tube is inserted in a longitudinal direction inside the outer tube, and wherein first ends of the outer tube and the inner tube are connected to each other and second ends of the outer tube and the inner tube are connected to each other to be sealed so that a chamber that is a sealed space is formed between the outer tube and the inner tube.

2. The secondary battery of claim 1, the inner tube is configured to be deformed inside the outer tube.

3. The secondary battery of claim 2, wherein the outer tube is made of a material that is not deformed even when the swelling occurs, and when the swelling occurs to increase in pressure inside the pouch, the inner tube is deformed so that a volume of the chamber is contracted.

4. The secondary battery of claim 3, wherein each of the outer tube and the inner tube is made of polypropylene, which is a material contained in the pouch, wherein the outer tube is manufactured with relatively low flexibility and high rigidity compared to the inner tube, and the inner tube is manufactured with relatively high flexibility and low rigidity compared to the outer tube.

5. The secondary battery of claim 2, wherein gaseous nitrogen ($N_2$) is injected into the chamber.

6. The secondary battery of claim 2, wherein each of the outer tube and the inner tube has a circular or elliptical cross-section.

7. The secondary battery of claim 1, wherein the adhesive contains an epoxy binder.

8. The secondary battery of claim 1, wherein the adhesive contains an acrylate binder.

9. The secondary battery of claim 1, wherein a plurality of hooks are installed on each of one surface and another surface, which face each other, within the inner tube so that the hooks are physically coupled to each other in a hook-and-loop fastener manner.

10. The secondary battery of claim 1, wherein the valve is disposed in parallel to an electrode lead that is drawn out from the electrode assembly to protrude out of the pouch.

11. A secondary battery module manufactured by coupling a plurality of secondary batteries of claim 1 to each other.

* * * * *